US012720410B2

(12) United States Patent
Lin et al.

(10) Patent No.: US 12,720,410 B2
(45) Date of Patent: Aug. 25, 2026

(54) METHOD AND APPARATUS FOR ENHANCED CLOSED ACCESS GROUP SELECTION IN MANUAL NETWORK SELECTION MODE

(71) Applicant: MediaTek Inc., Hsinchu City (TW)

(72) Inventors: Yuan-Chieh Lin, Hsinchu City (TW); Chia-Lin Lai, Hsinchu City (TW)

(73) Assignee: MediaTek Inc., Hsinchu (TW)

( * ) Notice: Subject to any disclaimer, the term of this patent is extended or adjusted under 35 U.S.C. 154(b) by 316 days.

(21) Appl. No.: 18/521,550

(22) Filed: Nov. 28, 2023

(65) Prior Publication Data

US 2024/0196307 A1 Jun. 13, 2024

Related U.S. Application Data

(60) Provisional application No. 63/386,329, filed on Dec. 7, 2022.

(51) Int. Cl.

| | |
|---|---|
| ***H04W 48/02*** | (2009.01) |
| ***H04W 48/18*** | (2009.01) |
| *H04W 84/04* | (2009.01) |

(52) U.S. Cl.

CPC ........... *H04W 48/02* (2013.01); *H04W 48/18* (2013.01); *H04W 84/042* (2013.01)

(58) Field of Classification Search

CPC ..... H04W 48/02; H04W 48/04; H04W 48/18; H04W 48/20; H04W 84/042; H04W 12/08; H04L 63/101; H04L 63/108

See application file for complete search history.

(56) References Cited

U.S. PATENT DOCUMENTS

| | | | | |
|---|---|---|---|---|
| 12,507,054 | B2 * | 12/2025 | Zhang | H04W 4/90 |
| 2021/0314848 | A1 | 10/2021 | Tiwari et al. | |
| 2022/0345989 | A1 | 10/2022 | Tiwari et al. | |
| 2023/0354175 | A1 * | 11/2023 | Lai | H04W 48/04 |
| 2023/0354179 | A1 * | 11/2023 | Lin | H04W 48/18 |
| 2024/0107407 | A1 * | 3/2024 | Kumar | H04W 36/08 |

FOREIGN PATENT DOCUMENTS

| | | | | |
|---|---|---|---|---|
| CN | 112770365 A * | 5/2021 | | H04W 36/0058 |
| WO | WO-2021172768 A1 * | 9/2021 | | H04W 88/085 |
| WO | WO 2021190217 A1 | 9/2021 | | |

(Continued)

OTHER PUBLICATIONS

European Patent Office, Communication pursuant to Article 94(3) EPC in European Patent Application No. 23214293.5, Jan. 7, 2025.

(Continued)

*Primary Examiner* — Siu M Lee

(74) *Attorney, Agent, or Firm* — Andy M. Han; Han IP PLLC

(57) ABSTRACT

Various solutions for enhanced closed access group (CAG) selection in manual network selection mode are described. An apparatus may determine that the apparatus supports CAG and operates in a manual network selection mode. The apparatus may detect a CAG cell associated with a CAG identifier (ID) in an allowed CAG list. The apparatus may indicate to a user whether the CAG ID is authorized based on time validity information associated with the CAG ID in the allowed CAG list.

6 Claims, 8 Drawing Sheets

(56) References Cited

FOREIGN PATENT DOCUMENTS

WO WO-2021232852 A1 * 11/2021 ............ H04W 76/18

OTHER PUBLICATIONS

European Telecommunications Standards Institute (ETSI); "Digital cellular telecommunications system (Phase 2+) (GSM); Universal Mobile Telecommunications System (UMTS); LTE; 5G; Non-Access-Stratum (NAS) functions related to Mobile Station (MS) in idle mode (3GPP TS 23.122 version 16.9.0 Release 16)", ETSI Technical Specification, vol. 3GPP CT, No. V16.9.0, Apr. 19, 2021 (Apr. 19, 2021), pp. 1-85, XP014397021.

Vivo: "KI #4: Conclusion of Key Issue #4—PNI-NPN", SA WG2 Meeting #S2-153E, S2-2208291, E-Meeting, Oct. 10-17, 2022.

European Patent Office, Partial Europen Search Report in European Patent Application No. 23214293.5, Jan. 30, 2024.

"3rd Generation Partnership Project; Technical Specification Group Services and System Aspects; Study on enhanced support of Non-Public Networks; Phase 2 (Release 18)", 3GPP Standard; Technical Report; 3GPP TR 23.700-08, 3rd Generation Partnership Project (3GPP), Mobile Competence Centre; 650, Route Des Lucioles; F-06921 Sophia-Antipolis Cedex; France, No. V1.3.0, Oct. 21, 2022 (Oct. 21, 2022), pp. 1-178, XP052211627.

* cited by examiner

DETERMINE, BY A PROCESSOR OF AN APPARATUS, THAT THE APPARATUS SUPPORTS CAG AND OPERATES IN A MANUAL NETWORK SELECTION MODE
810

DETECT, BY THE PROCESSOR, A CAG CELL ASSOCIATED WITH A CAG ID IN AN ALLOWED CAG LIST
820

INDICATE, BY THE PROCESSOR, TO A USER WHETHER THE CAG ID IS AUTHORIZED BASED ON TIME VALIDITY INFORMATION ASSOCIATED WITH THE CAG ID IN THE ALLOWED CAG LIST
830

Figure 9:
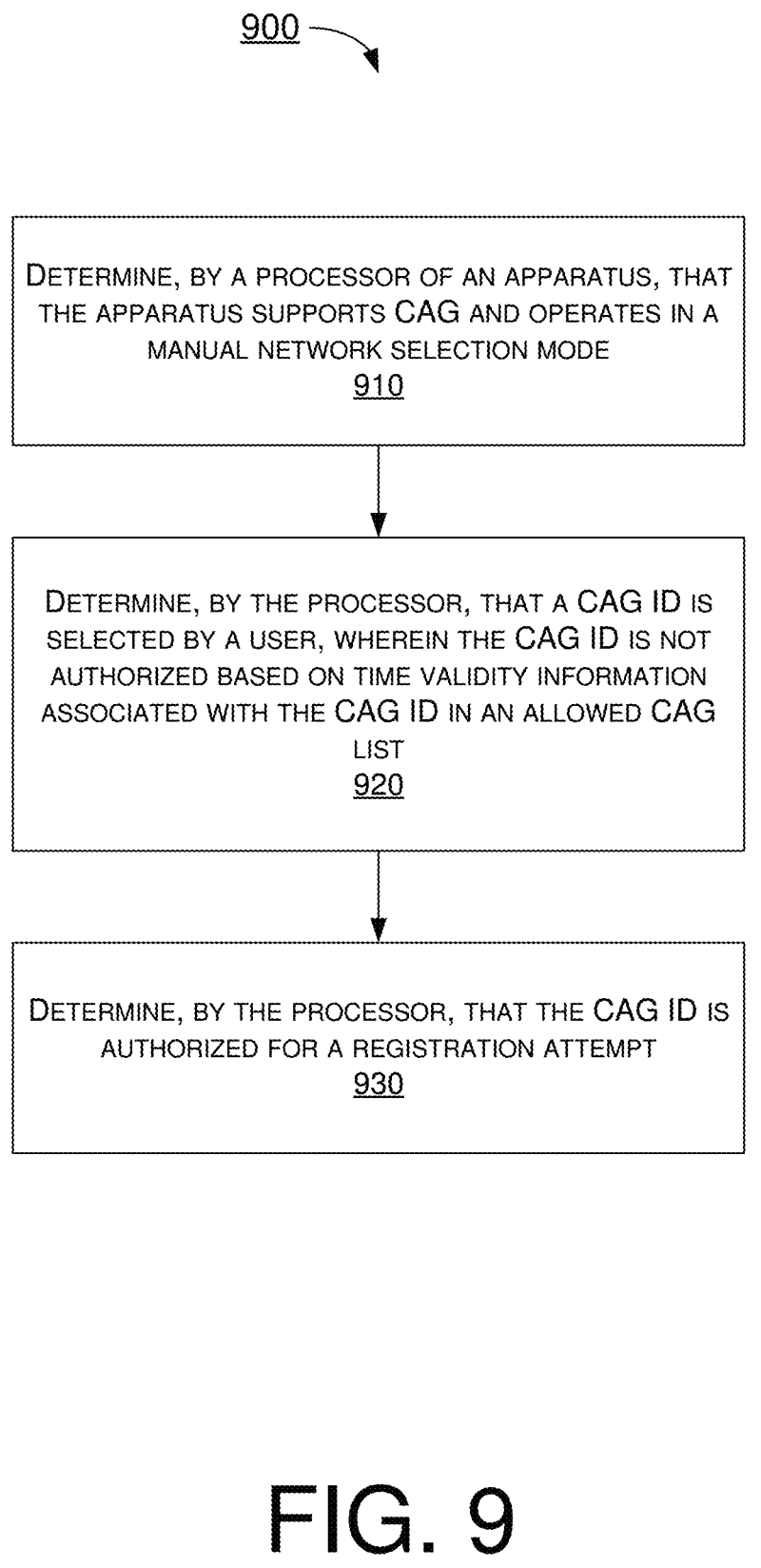

900

DETERMINE, BY A PROCESSOR OF AN APPARATUS, THAT THE APPARATUS SUPPORTS CAG AND OPERATES IN A MANUAL NETWORK SELECTION MODE
910

DETERMINE, BY THE PROCESSOR, THAT A CAG ID IS SELECTED BY A USER, WHEREIN THE CAG ID IS NOT AUTHORIZED BASED ON TIME VALIDITY INFORMATION ASSOCIATED WITH THE CAG ID IN AN ALLOWED CAG LIST
920

DETERMINE, BY THE PROCESSOR, THAT THE CAG ID IS AUTHORIZED FOR A REGISTRATION ATTEMPT
930

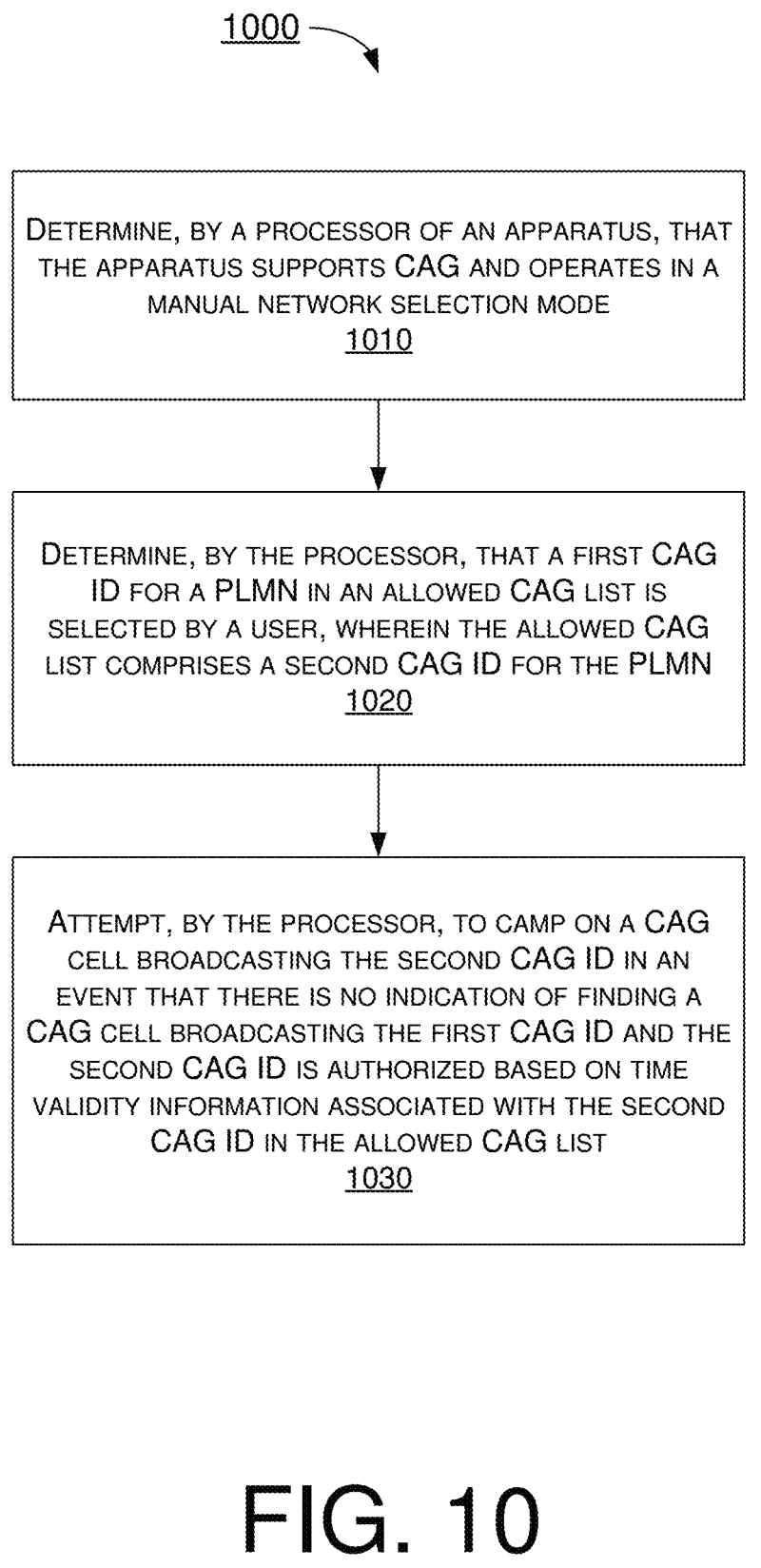

DETERMINE, BY A PROCESSOR OF AN APPARATUS, THAT THE APPARATUS SUPPORTS CAG AND OPERATES IN A MANUAL NETWORK SELECTION MODE
1010

DETERMINE, BY THE PROCESSOR, THAT A FIRST CAG ID FOR A PLMN IN AN ALLOWED CAG LIST IS SELECTED BY A USER, WHEREIN THE ALLOWED CAG LIST COMPRISES A SECOND CAG ID FOR THE PLMN
1020

ATTEMPT, BY THE PROCESSOR, TO CAMP ON A CAG CELL BROADCASTING THE SECOND CAG ID IN AN EVENT THAT THERE IS NO INDICATION OF FINDING A CAG CELL BROADCASTING THE FIRST CAG ID AND THE SECOND CAG ID IS AUTHORIZED BASED ON TIME VALIDITY INFORMATION ASSOCIATED WITH THE SECOND CAG ID IN THE ALLOWED CAG LIST
1030

FIG. 10

METHOD AND APPARATUS FOR ENHANCED CLOSED ACCESS GROUP SELECTION IN MANUAL NETWORK SELECTION MODE

CROSS REFERENCE TO RELATED PATENT APPLICATION(S)

The present disclosure is part of a non-provisional application claiming the priority benefit of U.S. Patent Application No. 63/386,329, filed 7 Dec. 2022, the content of which herein being incorporated by reference in its entirety.

TECHNICAL FIELD

The present disclosure is generally related to mobile communications and, more particularly, to enhanced closed access group (CAG) selection in manual network selection mode.

BACKGROUND

Unless otherwise indicated herein, approaches described in this section are not prior art to the claims listed below and are not admitted as prior art by inclusion in this section.

A public land mobile network (PLMN) is a network established and operated by an administration or recognized operating agency (ROA) for the specific purpose of providing land mobile communication services to the public. PLMN provides communication possibilities for mobile users. A PLMN may provide service in one or a combination of frequency bands. Access to PLMN services is achieved by means of an air interface involving radio communications between mobile phones and base stations with integrated IP network services. One PLMN may include multiple radio access networks (RANs) utilizing different radio access technologies (RATs) for accessing mobile services. RAN is part of a mobile communication system, which implements a radio access technology. Conceptually, RAN resides between a mobile device and provides connection with its core network (CN). Depending on the (3$^{rd}$ Generation Partnership Project (3GPP)) standards, mobile phones and other wireless connected devices are varyingly known as user equipment (UE), terminal equipment (TE), mobile stations (MS), or mobile termination (MT), etc. Examples of different RATs include 2$^{nd}$ generation (2G) Global System for Mobile Communications (GSM), 3$^{rd}$ generation (3G) Universal Mobile Telecommunications System (UMTS), 4$^{th}$ generation (4G) Long Term Evolution (LTE), 5$^{th}$ generation (5G) New Radio (NR), and other non-3GPP access RAT including Wireless Fidelity (Wi-Fi).

As compared to PLMN, a non-public network (NPN) is a network for non-public use. An NPN is either a stand-alone NPN (SNPN), i.e., operated by an NPN operator and not relying on network functions provided by a PLMN, or a public network integrated NPN (PNI-NPN), i.e., an NPN deployed with the support of a PLMN. That is, PNI-NPNs are NPNs made available via PLMNs e.g., by means of dedicated data network names (DNNs), or by one or more network slice instances allocated for the NPN. When a PNI-NPN is made available via a PLMN, the UE shall have a subscription of the PLMN in order to access this PNI-NPN. As network slicing does not enable the possibility to prevent UEs from trying to access the network in areas where the UE is not allowed to use the network slice allocated for the NPN, closed access groups (CAGs) can be used to apply access control for PNI-NPN. A CAG identifies a group of subscribers who are permitted to access one or more CAG cells associated to the CAG. More specifically, CAG is used for the PNI-NPNs to prevent UE(s), which are not allowed to access the NPN via the associated cell(s), from automatically selecting and accessing the associated CAG cell(s). CAG is used for access control, e.g., authorization at cell selection, and is configured in the subscription as part of the mobility restrictions. A CAG is identified by a CAG identifier (ID) which is unique within the scope of a PLMN ID.

Local or localized services are services that are provided locally (e.g., at specific/limited area and/or are bounded in time). A localized service provider is an application provider or a network operator who makes their services localized and to be offered to end user via a hosting network (e.g., an SNPN or a PNI-NPN). A hosting network is a network that provides (access for) localized services, while a home network is a network owning the currently in-use subscription or credential of the UE. End user can enable or disable to access localized services. If the end user is unable to access localized services, the UE (i.e., MS) may not access an NPN providing access for localized services.

In 3GPP Release 18, it is agreed that the standards for 5G NR will support localized services, but details of how the standards should be adapted with respect to UE operations are unclear and still under discussion. Therefore, there is a need to provide proper schemes to solve this issue.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the aforementioned issue pertaining to unclear UE operations for supporting localized services.

In one aspect, a method may involve an apparatus determining that the apparatus supports CAG and operates in a manual network selection mode. The method may also involve the apparatus detecting a CAG cell associated with a CAG ID in an allowed CAG list. The method may further involve the apparatus indicating to a user whether the CAG ID is authorized based on time validity information associated with the CAG ID in the allowed CAG list.

In one aspect, a method may involve an apparatus determining that the apparatus supports CAG and operates in a manual network selection mode. The method may also involve the apparatus determining that a CAG ID is selected by a user, wherein the CAG ID is not authorized based on time validity information associated with the CAG ID in an allowed CAG list. The method may further involve the apparatus determining that the CAG ID is authorized for a registration attempt.

In one aspect, a method may involve an apparatus determining that the apparatus supports CAG and operates in a manual network selection mode. The method may also involve the apparatus determining that a first CAG ID for a PLMN in an allowed CAG list is selected by a user, wherein the allowed CAG list comprises a second CAG ID for the PLMN. The method may further involve the apparatus attempting to camp on a CAG cell broadcasting the second CAG ID in an event that there is no indication of finding a CAG cell broadcasting the first CAG ID and the second CAG ID is authorized based on time validity information associated with the second CAG ID in the allowed CAG list.

It is noteworthy that, although description provided herein may be in the context of certain radio access technologies, networks and network topologies such as Long-Term Evolution (LTE), LTE-Advanced, LTE-Advanced Pro, $5^{th}$ Generation (5G), New Radio (NR), Internet-of-Things (IOT) and Narrow Band Internet of Things (NB-IOT), Industrial Internet of Things (IIoT), beyond 5G (B5G), and $6^{th}$ Generation (6G), the proposed concepts, schemes and any variation(s)/derivative(s) thereof may be implemented in, for and by other types of radio access technologies, networks and network topologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

FIG. 9 is a flowchart of another example process in accordance with an implementation of the present disclosure.

FIG. 10 is a flowchart of another example process in accordance with an implementation of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to enhanced CAG selection in manual network selection mode. According to the present disclosure, a number of possible solutions may be implemented separately or jointly. That is, although these possible solutions may be described below separately, two or more of these possible solutions may be implemented in one combination or another.

Figure 1:
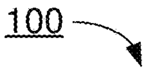
FIG. 1 is a diagram depicting an example scenario of a communication system supporting localized services in accordance with implementations of the present disclosure.
Figure 1:
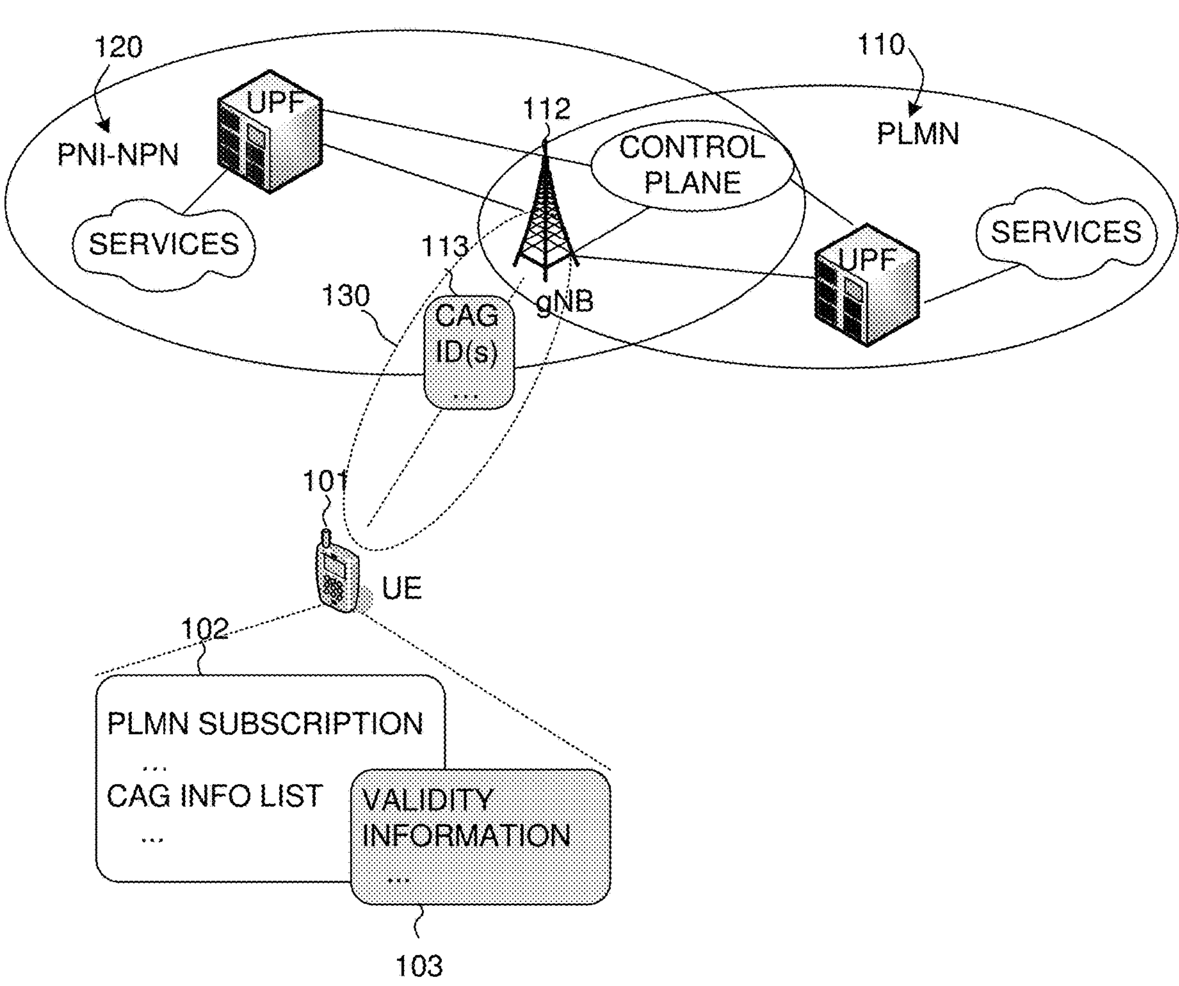

FIG. 1 illustrates an example scenario 100 of a communication system supporting localized services in accordance with implementations of the present disclosure. In scenario 100, the communication system includes a PLMN 110 and a PNI-NPN 120 providing access for localized services. The PLMN 110 may include control plane functionalities (e.g., an access and mobility management function (AMF)), user plane functionalities (e.g., a user plane function (UPF)), and applications that provide various services by communicating with a plurality of UEs including UE 101. A serving base station (BS) (e.g., a gNB) 112 belongs to part of the RAN 130. The RAN 130 provides radio access for the UE 101 via an RAT.

PNI-NPN network 120 may include control plane functionalities (optional, it may rely on PLMN's control plane functionality), user plane functionality (optional, it may rely on PLMN's user plane functionality), and applications that provides various services by communicating with a plurality of UEs including the UE 101. PNI-NPN 120 is a non-public network deployed with the support of a PLMN, e.g., PLMN 110, by sharing, e.g., RAN/gNB 112 and control plane functionalities. A CAG identifies a group of subscribers who are permitted to access one or more CAG cells associated to the CAG. CAG is used for the PNI-NPNs to prevent UE(s), which is/are not allowed to access the NPN via the associated cell(s), from automatically selecting and accessing the associated CAG cell(s). A CAG is identified by a CAG ID which is unique within the scope of a PLMN ID. A CAG cell may broadcast one or multiple CAG IDs 113 per PLMN, and a UE may be configured with CAG related configuration/information 102 (e.g., an (enhanced) CAG information list containing an Allowed CAG list per PLMN).

Local or localized services are services that are provided locally (e.g., at specific/limited area and/or are bounded in time (e.g., specific time period(s)). A localized service provider may be an application provider or a network operator who makes their services localized and to be offered to end user via a hosting network. A hosting network may be a network that provides access for localized services and can be an SNPN or a PNI-NPN, while a home network is network owning the currently in-use subscription or credential of the UE. In the example scenario 100 of FIG. 1, the PNI-NPN 120 is the hosting network providing access for localized services to the UE 101.

To enable the PNI-NPN 120 to provide access to localized services, the PNI-NPN operator may configure the network with information enabling the UEs to access the localized services according to validity of the localized services, and the information is determined in agreement with the localized service provider. For instance, the validity information may include: (i) identification of each localized service, e.g., to be used in UE route selection policy (URSP) rules, and (ii) validity criteria/restriction for each localized service, e.g., the validity of time period and/or (area of) location.

When localized services in a network are completed, all UEs registered with the network are expected to be moved to other networks or to other cells within the same network. The other networks may each be a home PLMN (HPLMN), visited PLMN (VPLMN) or another SNPN. A UE may stop using the network resources for localized services for numerous reasons, such as (i) localized services in a network are completed, (ii) validity conditions of network selection information are no longer met, (iii) the user decides to stop using the localized services before they are completed (e.g., end user disables to access localized services), and (iv) a policy decision is taken by the network, with the effect that the UE is deregistered before the localized services are completed. The validity information 103 (or called validity restrictions, criteria, or conditions) is provided or configured to the UE 101 as part of the localized service information, which is used to restrict the UE's access of the PNI-NPN (as hosting network) providing access for localized services. For providing localized services to the UE, a UE needs to be able to discover, select, and access a PNI-NPN (as hosting network) providing access for the localized services. The discovery mechanism is based on provisioning or configuring the UE with appropriate information.

PNI-NPN & CAG

PNI-NPNs are NPNs made available via PLMNs e.g., by means of dedicated DNNs, or by one or more network slice instances allocated for the NPN. The existing network slicing functionalities can apply. When a PNI-NPN is made available via a PLMN, then the UE shall have a subscription for the PLMN in order to access the PNI-NPN. A CAG identifies a group of subscribers who are permitted to access one or more CAG cells associated to the CAG. CAG is used for the PNI-NPNs to prevent UE(s), which is/are not allowed to access the NPN via the associated cell(s), from automatically selecting and accessing the associated CAG cell(s). A CAG is identified by a CAG ID which is unique within the scope of a PLMN ID. A CAG cell broadcasts one or multiple CAG IDs per PLMN. A CAG cell may also broadcast a human-readable network name (HRNN) per CAG ID.

To use CAG, a UE, which supports CAG as indicated as part of the UE 5G mobility management (5GMM) Core Network Capability, may be pre-configured or (re)configured with the following CAG related information. If the UE supports CAG, the UE may be provisioned by the network with a CAG related configuration (e.g., (enhanced) CAG information list containing an Allowed CAG list per PLMN)), consisting of zero or more entries, each entry containing: (i) a PLMN ID, (ii) an "Allowed CAG list" having zero or more CAG IDs, and (iii) an optional indication that "the UE is only allowed to access 5GS via CAG cells". The HPLMN may (pre-)configure or re-configure a UE with the above CAG related configuration using the UE Configuration Update procedure or other 5GMM procedures (e.g., registration procedure or service procedure). The above CAG related configuration is provided by the HPLMN on a per PLMN basis. In a PLMN, the UE shall only consider the CAG information provided for this PLMN.

When the subscribed CAG related configuration changes, the unified data management (UDM) may set a CAG information Subscription Change Indication and send it to the AMF. The AMF shall provide the UE with the CAG related configuration when the UDM indicates that the CAG related configuration within the Access and Mobility Subscription data has been changed. When AMF receives the indication from the UDM that the CAG related configuration within the Access and Mobility Subscription has changed, the AMF may use the CAG related configuration received from the UDM to update the UE. Once the AMF updates the UE and obtains an acknowledgment from the UE, the AMF may inform the UDM that the update was successful and the UDM may clear the CAG information Subscription Change Indication flag. The AMF may update the UE using either the UE Configuration Update procedure after registration procedure is completed, or by including the new CAG related configuration in the Registration Accept, the Registration Reject, the Deregistration Request, or the Service Reject.

When a UE is roaming and the serving PLMN provides the CAG related configuration, the UE shall update only the CAG related configuration provided for the serving PLMN, while the stored CAG related configuration for other PLMNs is not updated. When a UE is not roaming and the HPLMN provides the CAG related configuration, the UE shall update the CAG related configuration stored in the UE with the received CAG related configuration for all the PLMNs. The UE shall store the latest available CAG related configuration for every PLMN for which it is provided and keep it stored when the UE is de-registered or switched off. The CAG related configuration is only applicable with 5G system (5GS).

For network and cell selection, a CAG cell shall broadcast information such that only UEs supporting CAG are accessing the cell. A cell may be either a CAG cell or a normal PLMN cell (i.e., non-CAG cell). For access control, in order to prevent access to NPNs for authorized UE(s) in the case of network congestion or overload, existing mechanisms defined for control-plane load control, congestion and overload control can be used, as well as the access control and barring functionality, or Unified Access Control using the access categories can be used. The Mobility Restrictions shall be able to restrict the UE's mobility according to the Allowed CAG list (if configured in the subscription) and include an indication whether the UE is only allowed to access 5GS via CAG cells (if configured in the subscription).

During transition from connection management (CM)-IDLE to CM-CONNECTED and during registration after connected mode mobility from evolved-universal terrestrial radio access network (E-UTRAN) to next generation (NG)-RAN, the AMF shall verify whether UE access is allowed by Mobility Restrictions. If the UE is accessing the 5GS via a CAG cell and if at least one of the CAG ID(s) received from the NG-RAN is part of the UE's Allowed CAG list, then the AMF accepts the non-access stratum (NAS) request. If the UE is accessing the 5GS via a CAG cell and if none of the CAG ID(s) received from the NG-RAN are part of the UE's Allowed CAG list, then the AMF rejects the NAS request and the AMF may include CAG related configuration in the NAS reject message. The AMF then releases the NAS signaling connection for the UE by triggering the access network (AN) release procedure. If the UE is accessing the 5GS via a non-CAG cell and the UE's subscription contains an indication that the UE is only allowed to access 5GS via CAG cells, then the AMF rejects the NAS request and the AMF may include CAG related configuration in the NAS reject message. The AMF then releases the NAS signaling connection for the UE by triggering the AN release procedure.

During transition from radio resource control (RRC) Inactive state to RRC Connected state, when the UE initiates the RRC Resume procedure for RRC Inactive to RRC Connected state transition in a CAG cell, NG-RAN shall reject the RRC Resume request from the UE if none of the CAG IDs supported by the CAG cell are part of the UE's Allowed CAG list according to the Mobility Restrictions received from the AMF or if no Allowed CAG list has been received from the AMF. When the UE initiates the RRC Resume procedure for RRC Inactive to RRC Connected state transition in a non-CAG cell, NG-RAN shall reject the UE's Resume request if the UE is only allowed to access CAG cells according to the Mobility Restrictions received from the AMF.

During connected mode mobility procedures within NG-RAN, i.e., handover procedures, source NG-RAN shall not handover the UE to a target NG-RAN node if the target is a CAG cell and none of the CAG IDs supported by the target CAG cell are part of the UE's Allowed CAG list in the Mobility Restriction List or if no Allowed CAG list has been received from the AMF. Source NG-RAN shall not handover the UE to a non-CAG cell if the UE is only allowed to access CAG cells based on the Mobility Restriction List. If the target cell is a CAG cell, target NG-RAN shall reject the N2 based handover procedure if none of the CAG IDs supported by the CAG cell are part of the UE's Allowed CAG list in the Mobility Restriction List or if no Allowed CAG list has been received from the AMF. If the target cell is a non-CAG cell, target NG-RAN shall reject the N2 based handover procedure if the UE is only allowed to access CAG cells based on the Mobility Restriction List. When the AMF receives the Nudm_SDM_Notification from the UDM and the AMF determines that the Allowed CAG list or the indication whether the UE is only allowed to access CAG cells have changed, AMF shall update the Mobility Restrictions in the UE and the NG-RAN accordingly under the conditions.

CAG Selection in Manual Network Selection Mode

Figure 2:
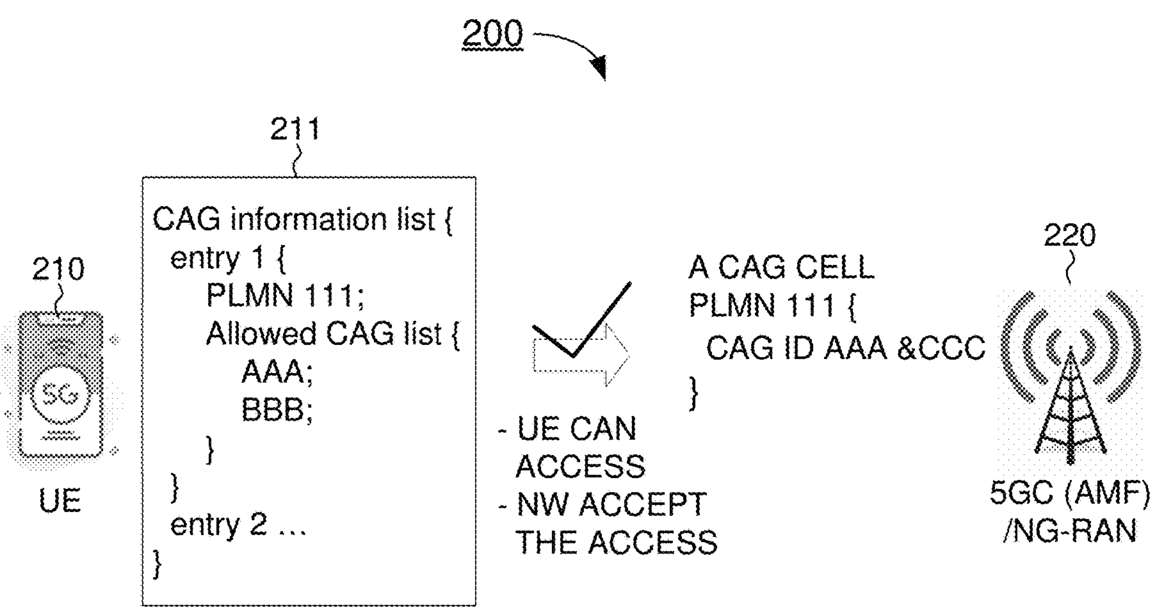
FIG. 2 is a diagram depicting an example scenario of network and cell selection and access control of CAG cells for PNI-NPN in accordance with an implementation of the present disclosure, where access to a CAG cell is accepted.

FIG. 2 illustrates an example scenario 200 of network and cell selection and access control of CAG cells for PNI-NPN in accordance with an implementation of the present disclosure, where access to a CAG cell is accepted. In scenario 200, the UE 210 is configured with a CAG related configuration (e.g., CAG information list 211) which includes a list of entries. Each entry may contain: (i) a PLMN ID, (ii) an "Allowed CAG list" having zero or more CAG IDs, and (iii) an optional indication that "the UE is only allowed to access 5GS via CAG cells". For instance, entry 1 contains PLMN 111, and an allowed CAG list with CAG IDs=AAA and BBB. Through 5GC/AMF and NG-RAN, a CAG cell broadcasts one or more CAG IDs per PLMN, e.g., CAG IDs=AAA and CCC can be accessed via the CAG cell 220. As a result, the UE 210 can access the CAG cell 220 in PLMN 111.

Figure 3:
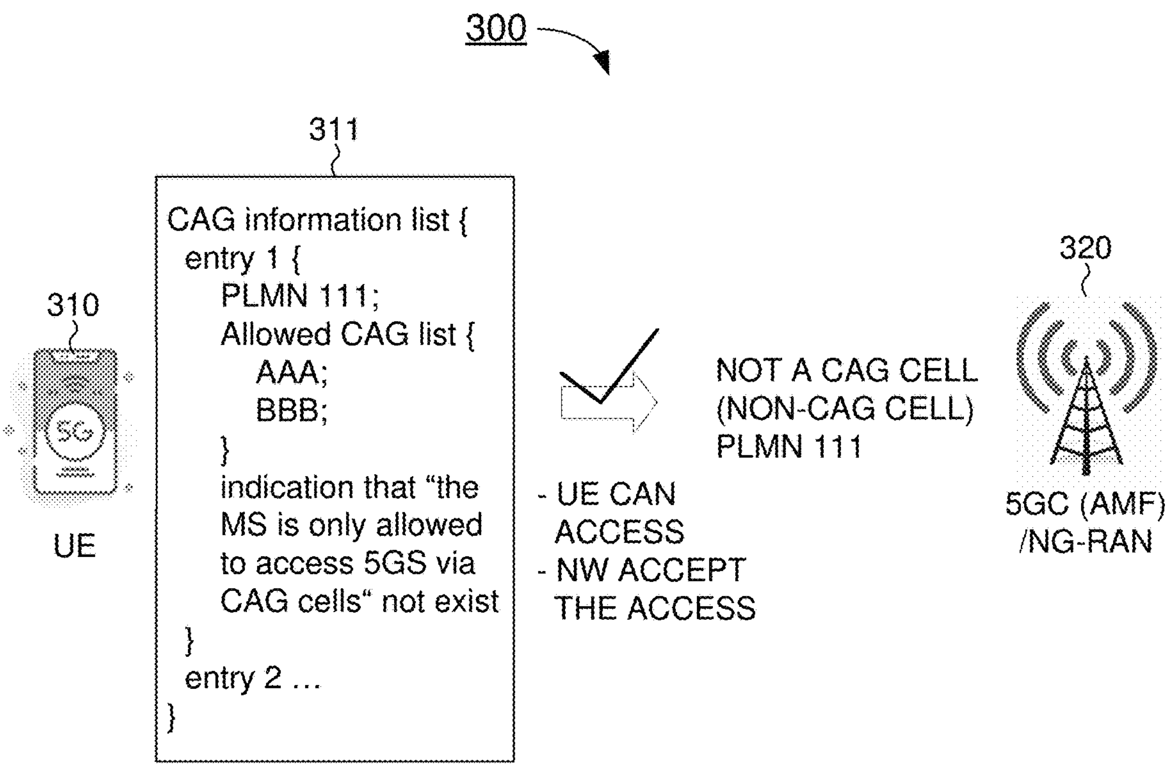
FIG. 3 is a diagram depicting another example scenario of network and cell selection and access control of CAG cells for PNI-NPN in accordance with an implementation of the present disclosure, where access to a non-CAG cell is accepted.

FIG. 3 illustrates another example scenario 300 of network and cell selection and access control of CAG cells for PNI-NPN in accordance with an implementation of the present disclosure, where access to a non-CAG cell is accepted. In scenario 300, the UE 310 is configured with a CAG related configuration (e.g., CAG information list 311) which includes a list of entries. Each entry may contain: (i) a PLMN ID, (ii) an "Allowed CAG list" having zero or more CAG IDs, and (iii) an optional indication that "the UE is only allowed to access 5GS via CAG cells". For example, entry 1 contains PLMN 111, and an allowed CAG list with CAG ID AAA and BBB. In addition, there is no indication in entry 1 that indicates the UE is only allowed to access 5GS via CAG cells. Through 5GC/AMF and NG-RAN 320, UE 310 finds non-CAG cell in PLMN 111 (i.e., no CAG IDs are broadcasted by the cell 320). Since UE 310 is allowed to access 5GS via non-CAG cell, as a result, UE 310 can access the non-CAG cell 320 in PLMN 111.

Figure 4:
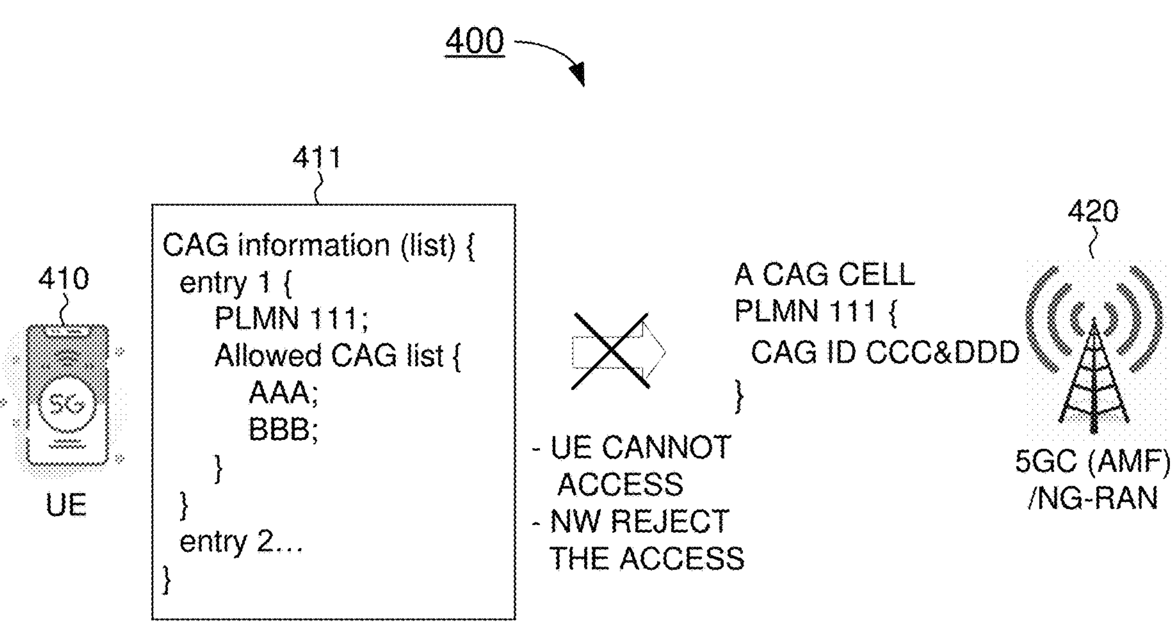
FIG. 4 is a diagram depicting another example scenario of network and cell selection and access control of CAG cells for PNI-NPN in accordance with an implementation of the present disclosure, where access to a CAG cell is rejected.

FIG. 4 illustrates another example scenario 400 of network and cell selection and access control of CAG cells for PNI-NPN in accordance with an implementation of the present disclosure, where access to a CAG cell is rejected. In scenario 400, UE 410 is configured with a CAG related configuration (e.g., CAG information list 411) which includes a list of entries. Each entry may contain: (i) a PLMN ID, (ii) an "Allowed CAG list" having zero or more CAG IDs, and (iii) an optional indication that "the UE is only allowed to access 5GS via CAG cells". For example, entry 1 contains PLMN 111, and an allowed CAG list with CAG IDs=AAA and BBB. Through 5GC/AMF and NG-RAN 420, a CAG cell broadcasts one or more CAG IDs per PLMN, e.g., CAG IDs=CCC and DDD. However, neither CAG ID=CCC nor CAG ID=DDD are in the "Allowed CAG list". As a result, UE 410 cannot access this CAG cell associated with CAG ID=CCC/DDD in PLMN 111.

Figure 5:
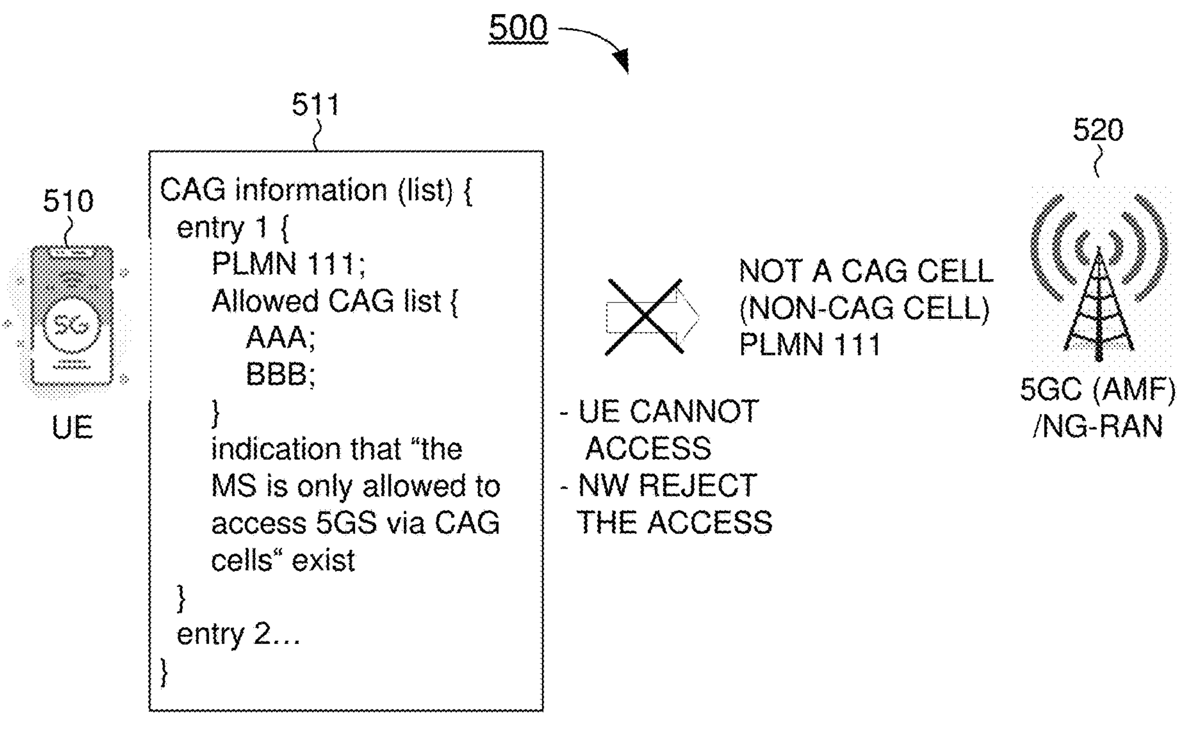
FIG. 5 is a diagram depicting another example scenario of network and cell selection and access control of CAG cells for PNI-NPN in accordance with an implementation of the present disclosure, where access to a non-CAG cell is rejected.

FIG. 5 illustrates another example scenario 500 of network and cell selection and access control of CAG cells for PNI-NPN in accordance with an implementation of the present disclosure, where access to a non-CAG cell is rejected. In scenario 500, UE 510 is configured with a CAG related configuration (CAG information list 511) which includes a list of entries. Each entry may contain: (i) a PLMN ID, (ii) an "Allowed CAG list" having zero or more CAG IDs, and (iii) an optional indication that "the UE is only allowed to access 5GS via CAG cells". For example, entry 1 contains PLMN 111, and an allowed CAG list with CAG IDs=AAA and BBB. In addition, there is an indication in entry 1 that indicates the UE is only allowed to access 5GS via CAG cells. Through 5GC/AMF and NG-RAN 520, UE 510 finds non-CAG cell in PLMN 111 (i.e., no CAG cell IDs are broadcasted by the cell 520). Since UE 510 is not allowed to access 5GS via non-CAG cell, UE 510 cannot access the non-CAG cell 520 in PLMN 111.

Enhanced CAG Selection for Localized Services

Local or localized service is localized (i.e., provided at specific/limited area and/or can be bounded in time). The service may be realized via applications (e.g., live or on-demand audio/video stream, electric game, IP multimedia subsystem (IMS), etc.), or connectivity (e.g., UE to UE, UE to Data Network, etc.). A localized service provider is an application provider or network operator who makes their services localized and to be offered to end users via a hosting network, which is a network that provides access for local or Localized services. A home network is a network owning the current in use subscription or credential of the UE. For PNI-NPN as hosting network, home network can be regarded as (Home-)PLMN. For providing localized services to a UE, the UE needs to be able to discover, select and access an NPN (as hosting network) providing access for the localized services. The discovery mechanism is based on provisioning/(pre-)configuring/signaling the UE with appropriate information.

Under proposed schemes in accordance with the present disclosure, a UE supporting CAG may be provided with a CAG information list, each entry in the list includes a PLMN (ID) and an the PLMN's Allowed CAG list containing one or more CAG IDs and time validity information associated with the CAG ID(s). With the time validity information, the UE may be able to determine whether a CAG ID of a detected CAG cell is authorized or not, and then determine how to present related information for CAG selection to the user in the manual network selection mode. Furthermore, based on the time validity information, the UE may be able to handle certain cases involving the user selecting an unauthorized CAG ID or the cases involving the UE not finding any CAG cell broadcasting the CAG ID that is manually selected by the user. Accordingly, by applying the schemes of the present disclosure, CAG selection with respect to UE's operation in the manual network selection mode is enhanced, allowing the UE to discover, select and access an NPN (as hosting network) providing access for the localized services.

Figure 6:
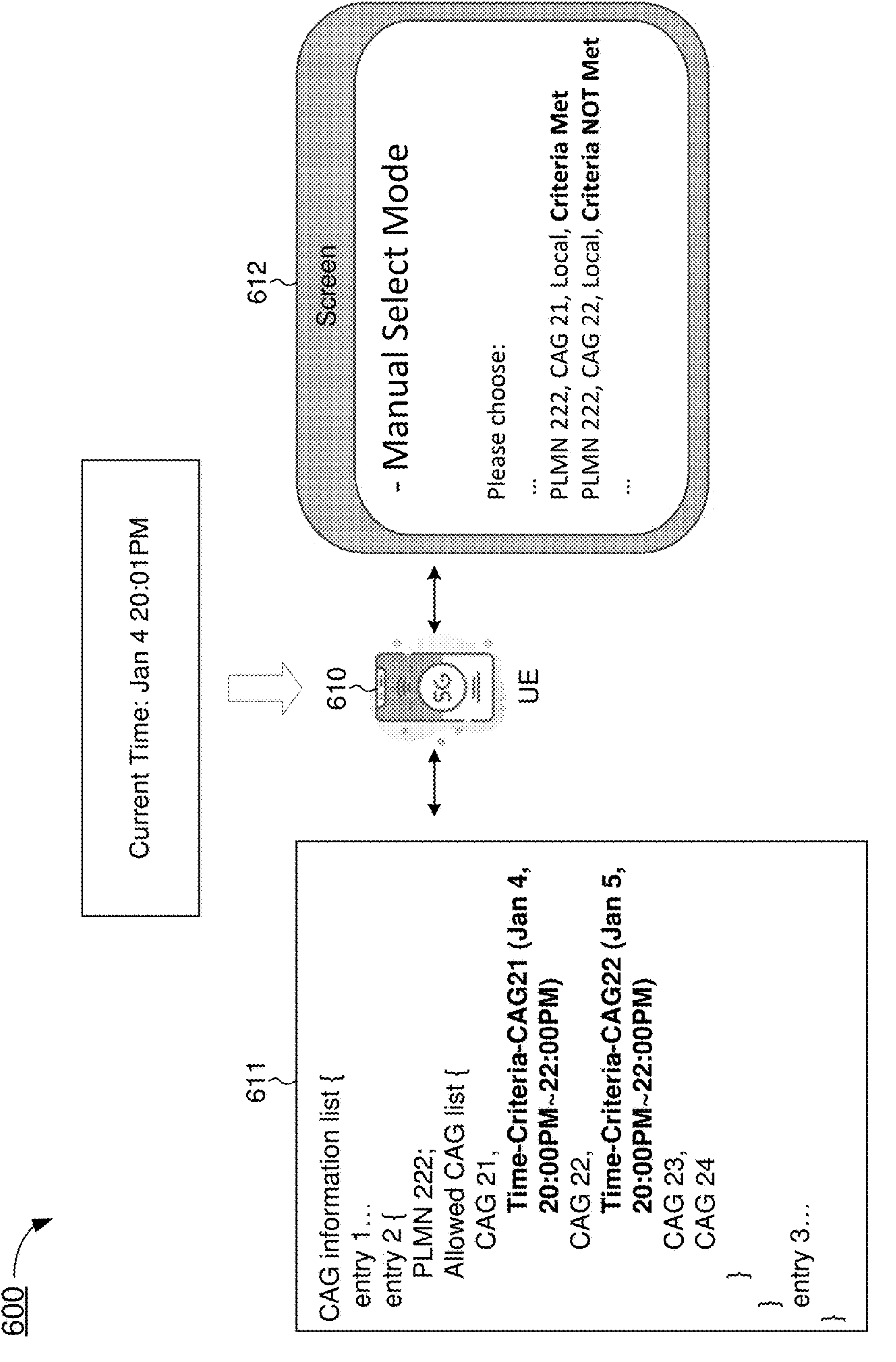
FIG. 6 is a diagram depicting an example scenario of presenting related information for CAG selection in the manual network selection mode in accordance with an implementation of the present disclosure.

In a first proposed scheme in accordance with the present disclosure, for each CAG ID (of a PLMN) presented to the user, the UE may indicate to the user whether the CAG ID is authorized based on the "Allowed CAG list" (of the PLMN) stored in the UE. FIG. 6 illustrates an example scenario 600 of presenting related information for CAG selection in the manual network selection mode in accordance with an implementation of the present disclosure. In scenario 600, a UE 610 supporting CAG and operating in the manual network selection mode is provided/(pre-)configured/signaled with a CAG information list 611 which includes a list of entries. Each entry may contain a PLMN ID and an Allowed CAG list containing one or more CAG IDs and time validity information associated with the CAG ID(s). For instance, the Allowed CAG list in entry 2 of the CAG information list 611 contains multiple CAG IDs (denoted as CAG 21 to 24 in FIG. 6). More specifically, CAG 21 is associated with time criteria (i.e., the time validity information) specifying a time period (e.g., January 4, 20:00 PM~22:00 PM), and CAG 22 is associated with time criteria (i.e., the time validity information) specifying another time period (e.g., January 5, 20:00 PM~22:00 PM). The screen 612 of the UE 610 may display the current network selection mode (e.g., the manual network selection mode) triggered by the user. Based on the CAG information list 611, the UE 610 may determine whether the CAG ID of a detected CAG cell is authorized and then present, on the screen 612, related information for CAG selection to the user. For instance, the combination of the PLMN ID=222 and the CAG ID=21 is presented along with the indication that this CAG ID is authorized (i.e., the time period "January 4, 20:00 PM~22:00 PM" matching the current time of the UE 610), while the combination of the PLMN ID=222 and the CAG ID=22 is presented along with the indication that this CAG ID is not authorized (i.e., the time period "January 5, 20:00 PM~22:00 PM" not matching the current time of the UE 610). In other words, the CAG ID=21 is presented to the user when determining that this CAG ID is authorized, while the CAG ID=22 is presented to the user when determining that this CAG ID is not authorized (the reason why 22 is presented when it is not authorized may be because the CAG cell broadcasts that "the PLMN allows a user to manually select the CAG ID").

In a second proposed scheme in accordance with the present disclosure, after the user selecting a CAG ID and the CAG ID is not authorized based on time validity information associated with the CAG ID in the Allowed CAG list, the UE may determine that the CAG ID is authorized for registration attempt. That is, despite the fact that the selected CAG ID is not authorized based on the time validity information associated with the CAG ID in the Allowed CAG list, the UE still considers/pretends, out of respect for the user's selection, that the CAG ID is authorized for registration attempt. In some implementations, the UE may assume that the time validity information includes at least one time period matching the current time. In some implementations, the UE may assume that there is no time validity information associated with the CAG ID in the allowed CAG list.

In a third proposed scheme in accordance with the present disclosure, after the user selecting a first CAG ID for a PLMN in the Allowed CAG list which also includes a second CAG ID for the same PLMN, the UE may attempt to camp on a CAG cell broadcasting the second CAG ID if there's no indication (e.g., from the access stratum (AS) of the UE) of finding a CAG cell broadcasting the first CAG ID and the second CAG ID is authorized based on the time validity information associated with the second CAG ID in the Allowed CAG list. Additionally, or optionally, the Allowed CAG list may further include a third CAG ID, which is not authorized, for the same PLMN, and the UE does not attempt to camp on a CAG cell broadcasting the third CAG ID, i.e., the UE only attempts to camp on a CAG cell broadcasting authorized CAG ID (e.g., the second CAG ID) for the same PLMN.

Illustrative Implementations

Figure 7:
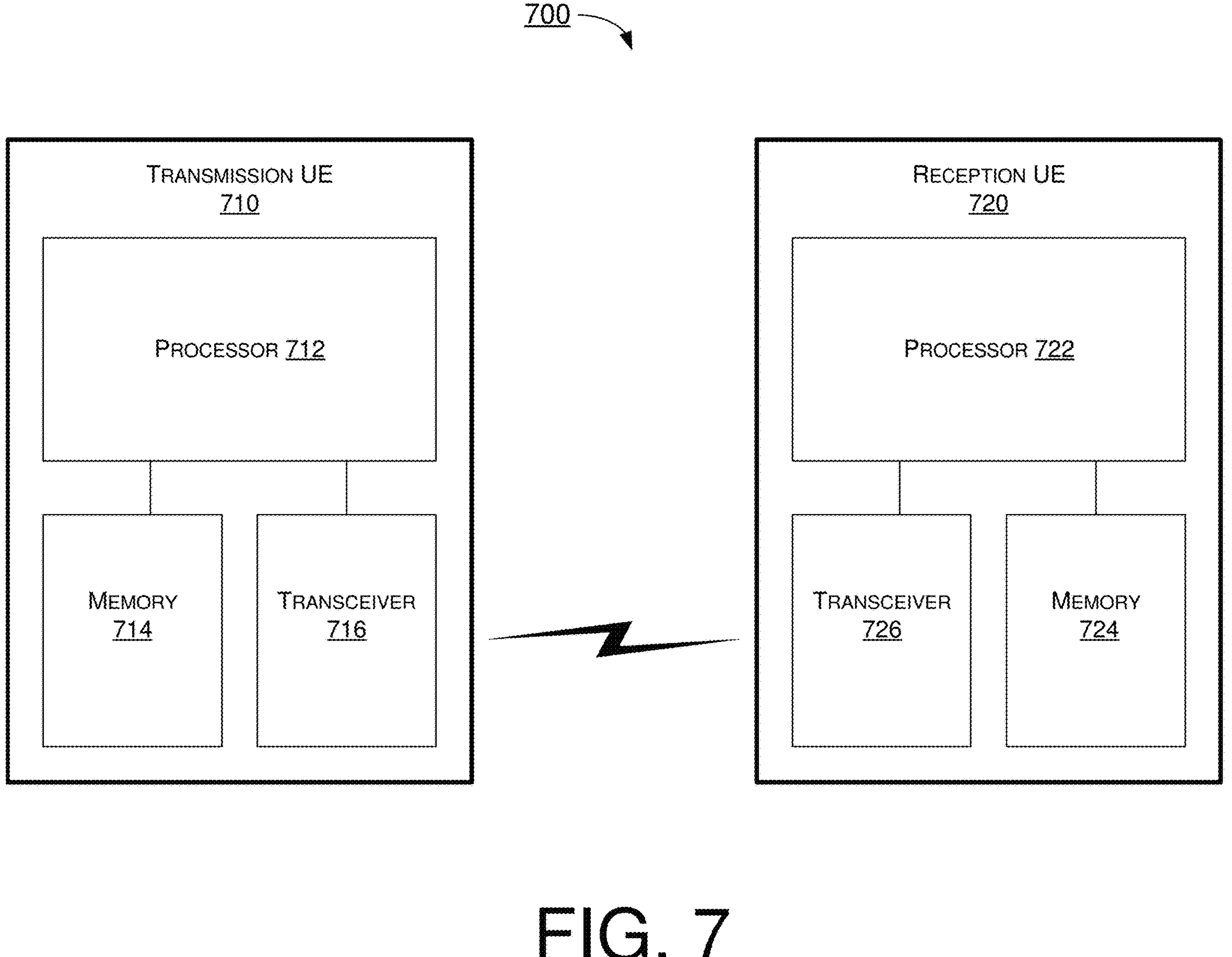
FIG. 7 is a block diagram of an example communication system in accordance with an implementation of the present disclosure.

FIG. 7 illustrates an example communication system 700 having an example communication apparatus 710 and an example network apparatus 720 in accordance with an implementation of the present disclosure. Each of communication apparatus 710 and network apparatus 720 may perform various functions to implement schemes, techniques, processes and methods described herein pertaining to PDCCH monitoring and scheduled cells combination for multi-cell scheduling, including scenarios/schemes described above as well as processes 800, 900 and 1000 described below.

Communication apparatus 710 may be a part of an electronic apparatus, which may be a UE such as a portable or mobile apparatus, a wearable apparatus, a wireless communication apparatus or a computing apparatus. For instance, communication apparatus 710 may be implemented in a smartphone, a smartwatch, a personal digital assistant, a digital camera, or a computing equipment such as a tablet computer, a laptop computer or a notebook computer. Communication apparatus 710 may also be a part of a machine type apparatus, which may be an IoT, NB-IOT, or IIoT apparatus such as an immobile or a stationary apparatus, a home apparatus, a wire communication apparatus or a computing apparatus. For instance, communication apparatus 710 may be implemented in a smart thermostat, a smart fridge, a smart door lock, a wireless speaker or a home control center. Alternatively, communication apparatus 710 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. Communication apparatus 710 may include at least some of those components shown in FIG. 7 such as a processor 712, for example. Communication apparatus 710 may further include one or more other components not pertinent to the proposed scheme of the present disclosure (e.g., internal power supply, display device and/or user interface device), and, thus, such component(s) of communication apparatus 710 are neither shown in FIG. 7 nor described below in the interest of simplicity and brevity.

Network apparatus 720 may be a part of an electronic apparatus, which may be a network node such as a base station, a small cell, a router or a gateway. For instance, network apparatus 720 may be implemented in an eNodeB in an LTE, LTE-Advanced or LTE-Advanced Pro network or in a gNB in a 5G, NR, IoT, NB-IOT or IIoT network. Alternatively, network apparatus 720 may be implemented in the form of one or more IC chips such as, for example and without limitation, one or more single-core processors, one or more multi-core processors, or one or more RISC or CISC processors. Network apparatus 720 may include at least some of those components shown in FIG. 7 such as a processor 722, for example. Network apparatus 720 may further include one or more other components not pertinent to the proposed scheme of the present disclosure (e.g., internal power supply, display device and/or user interface device), and, thus, such component(s) of network apparatus 720 are neither shown in FIG. 7 nor described below in the interest of simplicity and brevity.

In one aspect, each of processor 712 and processor 722 may be implemented in the form of one or more single-core processors, one or more multi-core processors, or one or more CISC processors. That is, even though a singular term "a processor" is used herein to refer to processor 712 and processor 722, each of processor 712 and processor 722 may include multiple processors in some implementations and a single processor in other implementations in accordance with the present disclosure. In another aspect, each of processor 712 and processor 722 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 712 and processor 722 is a special-purpose machine specifically designed, arranged and configured to perform specific tasks including enhanced CAG selection in manual network selection mode in a device (e.g., as represented by communication apparatus 710) and a network (e.g., as represented by network apparatus 720) in accordance with various implementations of the present disclosure.

In some implementations, communication apparatus 710 may also include a transceiver 716 coupled to processor 712 and capable of wirelessly transmitting and receiving data. In some implementations, communication apparatus 710 may further include a memory 714 coupled to processor 712 and capable of being accessed by processor 712 and storing data (e.g., CAG information list) therein. In some implementations, network apparatus 720 may also include a transceiver 726 coupled to processor 722 and capable of wirelessly transmitting and receiving data. In some implementations, network apparatus 720 may further include a memory 724 coupled to processor 722 and capable of being accessed by processor 722 and storing data therein. Accordingly, communication apparatus 710 and network apparatus 720 may wirelessly communicate with each other via transceiver 716 and transceiver 726, respectively. To aid better understanding, the following description of the operations, functionalities and capabilities of each of communication apparatus 710 and network apparatus 720 is provided in the context of a mobile communication environment in which communication apparatus 710 is implemented in or as a communication apparatus or a UE and network apparatus 720 is implemented in or as a network node of a communication network.

According to some schemes of the present disclosure, processor 712 may determine that communication apparatus 710 supports CAG and operates in a manual network selection mode. Then, processor 712 may detect, via transceiver 716, a CAG cell associated with a CAG ID in an allowed CAG list. Also, processor 712 may indicate to a user whether the CAG ID is authorized based on time validity information associated with the CAG ID in the allowed CAG list.

In some implementations, processor 712 may further determine whether the CAG ID is authorized based on time validity information associated with the CAG ID in the allowed CAG list.

In some implementations, the CAG ID may be authorized when the time validity information includes at least one time period matching the current time of communication apparatus 710.

In some implementations, the CAG ID may not be authorized when the time validity information includes at least one time period but none of the time period matches the current time of communication apparatus 710.

In some implementations, processor 712 may further present the CAG ID to the user when determining that the CAG ID is authorized.

In some implementations, processor 712 may further present the CAG ID to the user when determining that the CAG ID is not authorized. Additionally, or optionally, the presenting of the CAG ID to the user may be performed in an event that the CAG cell broadcasts that "the PLMN allows a user to manually select the CAG ID".

In some implementations, the manual network selection mode may be triggered by the user.

According to some schemes of the present disclosure, processor 712 may determine that the apparatus supports CAG and operates in a manual network selection mode. Then, processor 712 may determine that a CAG ID is selected by a user, wherein the CAG ID is not authorized based on time validity information associated with the CAG ID in an allowed CAG list. Also, processor 712 may determine that the CAG ID is authorized for a registration attempt.

In some implementations, the CAG ID may not be authorized when the time validity information includes at least one time period but none of the time period matches the current time of communication apparatus 710.

In some implementations, the determining that the CAG ID is authorized may include assuming that the time validity information includes at least one time period matching the current time of communication apparatus 710.

In some implementations, the determining that the CAG ID is authorized may include assuming that there is no time validity information associated with the CAG ID in the allowed CAG list.

In some implementations, the manual network selection mode may be triggered by the user.

In some implementations, the allowed CAG list may be received via a downlink (DL) NAS message. For instance, the DL NAS message may be a Registration Accept, a Registration Reject, a Deregistration Request, a Service Reject, or a Configuration Update Command.

According to some schemes of the present disclosure, processor 712 may determine that communication apparatus 710 supports CAG and operates in a manual network selection mode. Then, processor 712 may determine that a first CAG ID for a PLMN in an allowed CAG list is selected by a user, wherein the allowed CAG list includes a second CAG ID for the PLMN. Also, processor 712 may attempt, via transceiver 716, to camp on a CAG cell broadcasting the second CAG ID in an event that there is no indication of finding a CAG cell broadcasting the first CAG ID and the second CAG ID is authorized based on time validity information associated with the second CAG ID in the allowed CAG list.

In some implementations, the second CAG ID may be authorized when the time validity information includes at least one time period matching the current time of communication apparatus 710.

In some implementations, the allowed CAG list may further include a third CAG ID for the PLMN, and the third CAG ID may not be authorized based on another time validity information associated with the third CAG ID in the allowed CAG list.

In some implementations, the third CAG ID may not be authorized when the other time validity information includes at least one time period but none of the time period matches the current time of communication apparatus 710.

In some implementations, processor 712 may further determine not to attempt to camp on a CAG cell broadcasting the third CAG ID in an event that there is no indication of finding a CAG cell broadcasting the first CAG ID.

In some implementations, the manual network selection mode may be triggered by the user.

Illustrative Processes

Figure 8:
FIG. 8 is a flowchart of an example process in accordance with an implementation of the present disclosure.

FIG. 8 illustrates an example process 800 in accordance with an implementation of the present disclosure. Process 800 may be an example implementation of above scenarios/schemes, whether partially or completely, with respect to enhanced CAG selection in manual network selection mode. Process 800 may represent an aspect of implementation of features of communication apparatus 710. Process 800 may include one or more operations, actions, or functions as illustrated by one or more of blocks 810 to 830. Although illustrated as discrete blocks, various blocks of process 800 may be divided into additional blocks, combined into fewer blocks, or eliminated, depending on the desired implementation. Moreover, the blocks of process 800 may be executed in the order shown in FIG. 8 or, alternatively, in a different order. Process 800 may be implemented by communication apparatus 710 or any suitable UE or machine type devices. Solely for illustrative purposes and without limitation, process 800 is described below in the context of communication apparatus 710. Process 800 may begin at block 810.

At 810, process 800 may involve processor 712 of communication apparatus 710 determining that communication apparatus 710 supports CAG and operates in a manual network selection mode. Process 800 may proceed from 810 to 820.

At 820, process 800 may involve processor 712 detecting, via transceiver 716, a CAG cell associated with a CAG ID in an allowed CAG list. Process 800 may proceed from 820 to 830.

At 830, process 800 may involve processor 712 indicating to a user whether the CAG ID is authorized based on time validity information associated with the CAG ID in the allowed CAG list.

In some implementations, process 800 may further involve processor 712 determining whether the CAG ID is authorized based on time validity information associated with the CAG ID in the allowed CAG list.

In some implementations, the CAG ID may be authorized when the time validity information includes at least one time period matching the current time of communication apparatus 710.

In some implementations, the CAG ID may not be authorized when the time validity information includes at least one time period but none of the time period matches the current time of communication apparatus 710.

In some implementations, process 800 may further involve processor 712 presenting the CAG ID to the user when determining that the CAG ID is authorized.

In some implementations, process 800 may further involve processor 712 presenting the CAG ID to the user when determining that the CAG ID is not authorized. Additionally, or optionally, the presenting of the CAG ID to the user may be performed in an event that the CAG cell broadcasts that "the PLMN allows a user to manually select the CAG ID".

In some implementations, the manual network selection mode may be triggered by the user.

FIG. 9 illustrates an example process 900 in accordance with an implementation of the present disclosure. Process 900 may be an example implementation of above scenarios/schemes, whether partially or completely, with respect to enhanced CAG selection in manual network selection mode. Process 900 may represent an aspect of implementation of features of communication apparatus 710. Process 900 may include one or more operations, actions, or functions as illustrated by one or more of blocks 910 to 930. Although illustrated as discrete blocks, various blocks of process 900 may be divided into additional blocks, combined into fewer blocks, or eliminated, depending on the desired implementation. Moreover, the blocks of process 900 may be executed in the order shown in FIG. 9 or, alternatively, in a different order. Process 900 may be implemented by communication apparatus 710 or any suitable UE or machine type devices. Solely for illustrative purposes and without limitation, process 900 is described below in the context of communication apparatus 710. Process 900 may begin at block 910.

At 910, process 900 may involve processor 712 of communication apparatus 710 determining that communication apparatus 710 supports CAG and operates in a manual network selection mode. Process 900 may proceed from 910 to 920.

At 920, process 900 may involve processor 712 determining that a CAG ID is selected by a user, wherein the CAG ID is not authorized based on time validity information associated with the CAG ID in an allowed CAG list. Process 900 may proceed from 920 to 930.

At 930, process 900 may involve processor 712 determining that the CAG ID is authorized for a registration attempt.

In some implementations, the CAG ID may not be authorized when the time validity information includes at least one time period but none of the time period matches the current time of communication apparatus 710.

In some implementations, the determining that the CAG ID is authorized may include assuming that the time validity information includes at least one time period matching the current time of communication apparatus 710.

In some implementations, the determining that the CAG ID is authorized may include assuming that there is no time validity information associated with the CAG ID in the allowed CAG list.

In some implementations, the manual network selection mode may be triggered by the user.

In some implementations, the allowed CAG list may be received via a DL NAS message.

FIG. 10 illustrates an example process 1000 in accordance with an implementation of the present disclosure. Process 1000 may be an example implementation of above scenarios/schemes, whether partially or completely, with respect to enhanced CAG selection in manual network selection mode. Process 1000 may represent an aspect of implementation of features of communication apparatus 710. Process 1000 may include one or more operations, actions, or functions as illustrated by one or more of blocks 1010 to 1030. Although illustrated as discrete blocks, various blocks of process 1000 may be divided into additional blocks, combined into fewer blocks, or eliminated, depending on the desired implementation. Moreover, the blocks of process 1000 may be executed in the order shown in FIG. 10 or, alternatively, in a different order. Process 1000 may be implemented by communication apparatus 710 or any suitable UE or machine type devices. Solely for illustrative purposes and without limitation, process 1000 is described below in the context of communication apparatus 710. Process 1000 may begin at block 1010.

At 1010, process 1000 may involve processor 712 of communication apparatus 710 determining that communication apparatus 710 supports CAG and operates in a manual network selection mode. Process 1000 may proceed from 1010 to 1020.

At 1020, process 1000 may involve processor 712 determining that a first CAG ID for a PLMN in an allowed CAG list is selected by a user, wherein the allowed CAG list includes a second CAG ID for the PLMN. Process 1000 may proceed from 1020 to 1030.

At 1030, process 1000 may involve processor 712 attempting, via transceiver 716, to camp on a CAG cell broadcasting the second CAG ID in an event that there is no indication of finding a CAG cell broadcasting the first CAG ID and the second CAG ID is authorized based on time validity information associated with the second CAG ID in the allowed CAG list.

In some implementations, the second CAG ID may be authorized when the time validity information includes at least one time period matching the current time of communication apparatus 710.

In some implementations, the allowed CAG list may further include a third CAG ID for the PLMN, and the third CAG ID may not be authorized based on another time validity information associated with the third CAG ID in the allowed CAG list.

In some implementations, the third CAG ID may not be authorized when the other time validity information includes at least one time period but none of the time period matches the current time of communication apparatus 710.

In some implementations, process 1000 may further involve processor 712 determining not to attempt to camp on a CAG cell broadcasting the third CAG ID in an event that there is no indication of finding a CAG cell broadcasting the first CAG ID.

In some implementations, the manual network selection mode may be triggered by the user.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:

determining, by a processor of an apparatus, that the apparatus supports closed access group (CAG) and operates in a manual network selection mode;

detecting, by the processor, a CAG cell associated with a CAG identifier (ID) in an allowed CAG list;

indicating, by the processor, to a user whether the CAG ID is authorized based on time validity information associated with the CAG ID in the allowed CAG list;

determining, by the processor, whether the CAG ID is authorized based on the time validity information associated with the CAG ID in the allowed CAG list; and presenting, by the processor, the CAG ID to the user when determining that the CAG ID is not authorized.

2. The method of claim 1, wherein the CAG ID is authorized when the time validity information comprises at least one time period matching the apparatus' current time.

3. The method of claim 1, wherein the CAG ID is not authorized when the time validity information comprises at least one time period but none of the time period matches the apparatus' current time.

4. The method of claim 1, further comprising:

presenting, by the processor, the CAG ID to the user when determining that the CAG ID is authorized.

5. The method of claim 1, wherein the presenting of the CAG ID to the user is performed in an event that the CAG cell broadcasts that the PLMN allows the user to manually select the CAG ID.

6. The method of claim 1, wherein the manual network selection mode is triggered by the user.

* * * * *